2 Sheets—Sheet 1.

G. A. FRY.
Grain-Meter.

No. 226,511. Patented April 13, 1880.

Witnesses:
A. L. Durand
E. H. Bradford

Inventor:
Geo. A. Fry
By H. J. Ennis,
Atty.

2 Sheets—Sheet 2.

G. A. FRY.
Grain-Meter.

No. 226,511. Patented April 13, 1880.

Witnesses:
F. L. Arnaud
E. H. Bradford

Inventor:
Geo. A. Fry
By H. F. Ennis
atty

UNITED STATES PATENT OFFICE.

GEORGE A. FRY, OF DEFIANCE, IOWA.

GRAIN-METER.

SPECIFICATION forming part of Letters Patent No. 226,511, dated April 13, 1880.

Application filed January 24, 1880.

*To all whom it may concern:*

Be it known that I, GEORGE A. FRY, of Defiance, in the county of Shelby and State of Iowa, have invented certain new and useful Improvements in Automatic Grain Weighers and Registers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements in apparatus for weighing grain; and it has for its object to provide a machine by means of which different varieties or kinds of grain may be automatically weighed and the weight registered, as more fully hereinafter explained.

To this end the invention consists in a vertically-reciprocating platform connected to a scale-beam and with certain registering mechanism and devices for automatically operating the same, in combination with a truck mounted upon wheels adapted to travel upon inversely-inclined ways on the platform, the said truck being adapted to carry two vessels, into and from which the grain is alternately charged and discharged, so as to automatically reciprocate the said truck back and forth, and, in connection with proper mechanism, bring the said receptacles alternately into position to operate the scales, as more fully hereinafter specified.

Figure 1:
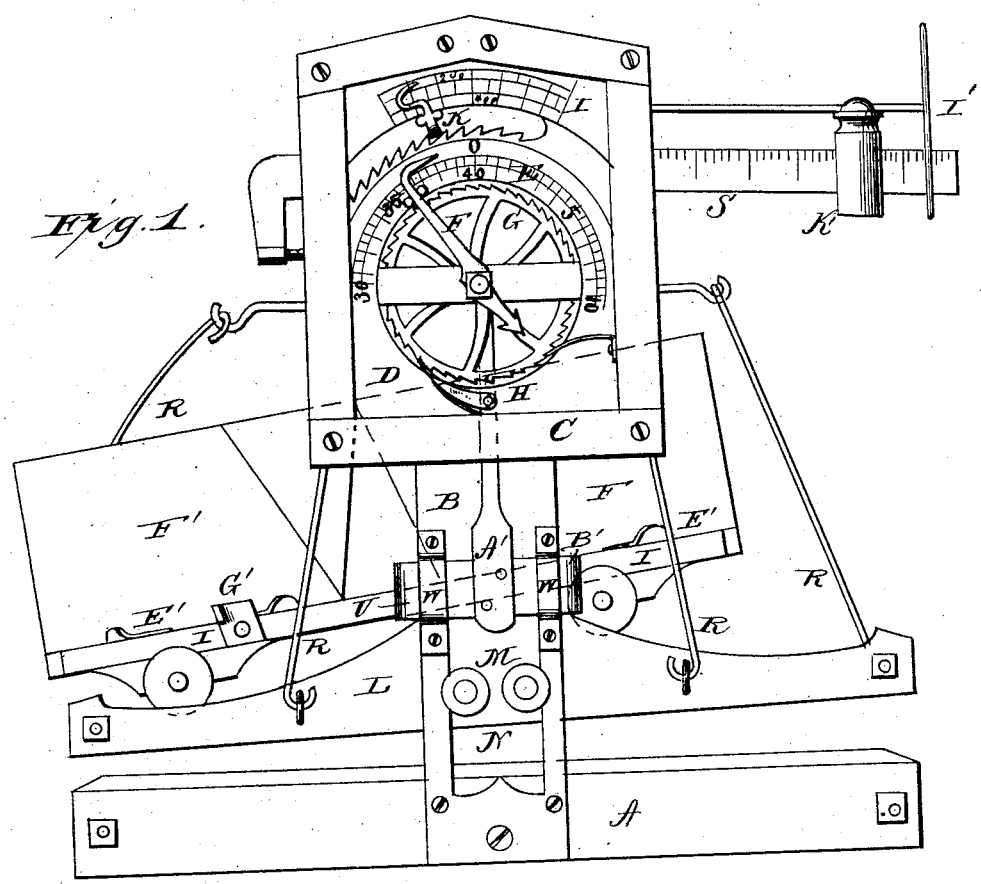
Figure 2:
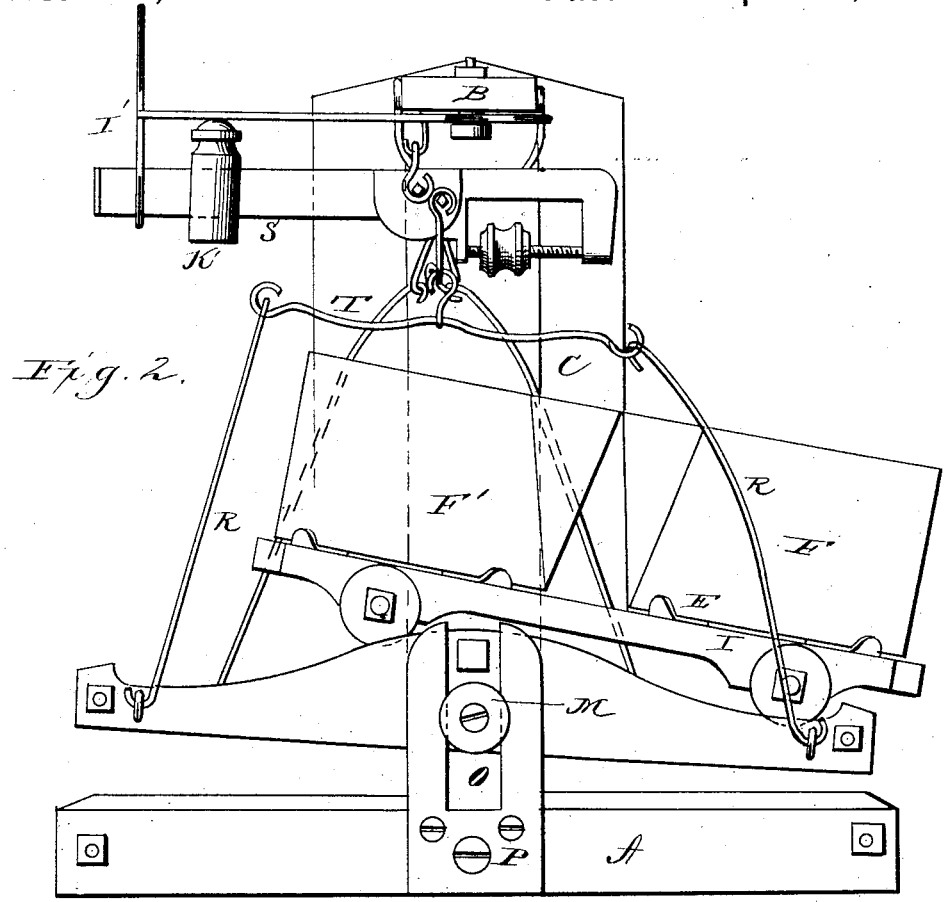
Figure 3:
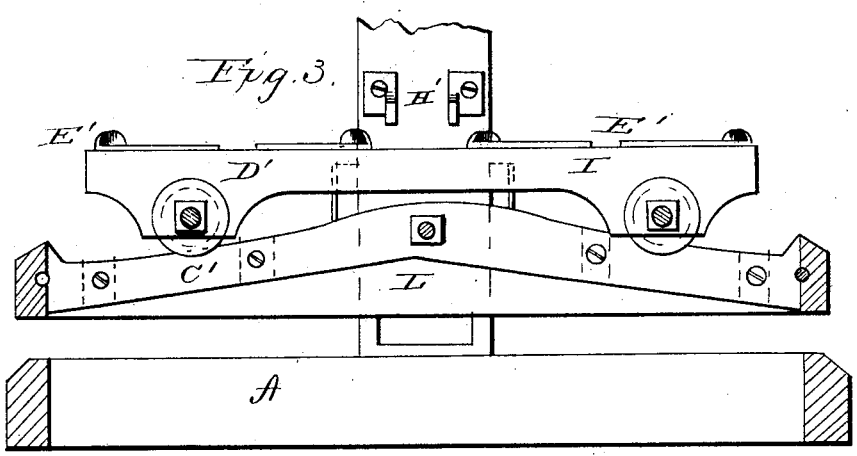

In the drawings, Figure 1 represents a front elevation of my improved apparatus; Fig. 2, a rear elevation of the same, and Fig. 3 a longitudinal vertical section of the apparatus.

The letter A indicates the base of the apparatus, which supports the various parts, and B a vertical standard rising from the same and carrying a horizontal rearward extension at its top. The said standard B supports, at or near its upper end in front, a casing, C, having a transparent face, D, in which casing are located the parts of the registering device. The said registering device may be constructed according to any of the well-known principles so as to register from one upward as the scale-beam is successively depressed. In the present instance it consists of a dial, E, and index or pointer F, the latter carried on a shaft having a ratchet-wheel, G, operated step by step by means of a pawl or pawls, H, to indicate units, and a supplemental dial, I, and pointer K, operated through the medium of an additional pawl and ratchet, to indicate hundreds and thousands.

The letter L indicates a platform, having at its rear and front the friction-rollers M, traveling in slots N and O in the standard B at the front of the frame, and a short standard, P, at the rear of frame. The said platform is connected at each side, by means of the hangers or links R, with a scale-beam, S, pivoted to or fulcrumed to a hanger, T, secured to the horizontal extension of the standard B.

The letter U indicates a horizontal reciprocating slide supported in guides W, secured to the front of the standard B, the said slide carrying a vertical arm, A', extending into the register-casing and connected with the registering mechanism therein. The said slide has each end bent at a right angle, forming an abutment, B', by which said slide is reciprocated, in connection with other mechanism, as more fully hereinafter specified.

The platform L is provided with ways or rails C' at each side, inclined from the center toward the ends, upon which the grooved wheels of a traveling or reciprocating truck, D', are mounted and adapted to travel. The said truck is provided with seats E' at each end, to hold the removable vessels F F', which receive the grain to be weighed. The shafts of said truck project at the front, so as to bear alternately against the abutments on the reciprocating slide as said truck is moved to bring the ends alternately toward the center of the platform and move the said slide to one side or the other, as may be required.

To the front of the truck, near each end, are secured the forwardly-projecting arms G', which are adapted to engage alternately and be held by the inwardly-projecting arms H', secured to the rear of the standard B when the truck is elevated by the depression of the scale-beam, as more fully hereinafter specified.

The scale-beam moves in a guide, I', which limits its movement in either direction, and is graduated and provided with a sliding weight, K', by means of which it may be set to tip when a given volume of different grains—such as oats, wheat, or corn—is to be weighed.

The operation of my invention will be readily understood in connection with the above description. The parts being in the position shown in Fig. 1, the vessel F' is full and ready to be removed, and the vessel F is empty and ready to receive the grain. Upon removing the vessel F', which can be done in any convenient manner, and filling in the vessel F, when the given amount of grain has been collected in the vessel F the scale-beam will be counterbalanced, releasing the arms G' from the arms H' on one side, and permitting the truck, by reason of the weight of the vessel M' and the inclined ways, to drop to one side, the projecting shaft of the approaching end of the truck striking the abutment at one side of the slide and causing the registering device to register one. When the vessel arrives at the end of the truck the weight of the vessel serves to tip the truck on its central supports, relieving the scale-beam of its weight and allowing the counter-balance on the scale-beam to bring the parts to a normal position. This operation is kept up continuously while the grain is being measured, thus serving automatically to register the weight of the grain passing through the apparatus.

Having thus fully described my invention, what I claim, and desire to secure by Letters Patent, is—

1. The combination, in an apparatus for weighing grain, of an oscillating platform suspended from a counterbalanced scale-beam and connected with suitable registering mechanism, of a reciprocating truck traveling on inclined ways attached to the platform, and mechanism for tripping said platform and operating the scale-beam and registering devices, substantially as specified.

2. In combination with the platform and the standards at each side, slotted, as described, the friction-rollers forming a support for said platform, and the links connecting said platform to the scale-beam, with the mechanism for locking and releasing the truck to operate the respective parts, substantially as specified.

3. In combination with the oscillating platform L, the truck D', mounted on the ways C', and provided with projecting shafts, and the slide U, having abutments B', adapted to be operated by said projecting shafts, substantially as and for the purposes specified.

4. In combination with the truck D', mounted on the platform L, and adapted to travel on ways thereon, the projecting arms G, and the arms H' on the standard B, the whole adapted to operate substantially as specified.

5. In combination with the reciprocating truck, its supporting-platform, and the scale-beam, the removable vessels for the grain, the whole arranged to operate substantially as and for the purposes specified.

6. In combination with the platform, the reciprocating truck, the registering mechanism, and mechanism connecting the truck to the scale-beam, the guide for limiting the movement of the scale-beam to hold the same in position until the reciprocating truck is released, substantially as specified.

In testimony that I claim the foregoing I have hereunto set my hand this 31st day of October, 1879.

GEORGE A. FRY.

Witnesses:
J. A. FLAUGHER,
W. H. FLAUGHER.